(12) United States Patent
Nelson (10) Patent No.: US 8,151,670 B2
(45) Date of Patent: Apr. 10, 2012

(54) SHEATH AND CONDUCTOR STRIPPERS

(76) Inventor: James M. Nelson, Helena, MT (US)

( * ) Notice: Subject to any disclaimer, the term of this patent is extended or adjusted under 35 U.S.C. 154(b) by 0 days.

(21) Appl. No.: 12/151,238

(22) Filed: Aug. 1, 2008

(65) Prior Publication Data

US 2010/0024604 A1   Feb. 4, 2010

(51) Int. Cl.
*H02G 1/12* (2006.01)
(52) U.S. Cl. .......................................... 81/9.4
(58) Field of Classification Search .............. 81/9.4, 81/9.41–9.44; 30/90.1, 91.1, 91.2
See application file for complete search history.

(56) References Cited

U.S. PATENT DOCUMENTS

| | | | |
|---|---|---|---|
| 438,848 A | 10/1890 | Keys | |
| 1,107,210 A * | 8/1914 | Adams | 81/9.4 |
| 1,124,118 A | 1/1915 | Elwell | |
| 1,349,563 A | 8/1920 | Day | |
| 1,354,365 A | 9/1920 | Aaron | |
| 1,617,703 A | 2/1927 | Christianson | |
| 1,692,030 A | 11/1928 | Friedman | |
| 1,771,733 A | 7/1930 | Ott | |
| 2,594,363 A | 4/1952 | Stephenson | |
| 2,697,956 A | 12/1954 | Cook | |
| 3,107,287 A * | 10/1963 | Schechter | 81/9.4 |
| 4,028,756 A | 6/1977 | Couto | |
| 4,070,930 A | 1/1978 | Oprins | |
| 4,366,730 A | 1/1983 | Casadio | |
| 4,393,587 A | 7/1983 | Kloosterman | |
| 4,503,574 A * | 3/1985 | Norin et al. | 7/107 |
| 4,586,256 A | 5/1986 | Weimann | |
| 4,607,544 A | 8/1986 | Jewell, Jr. | |
| 4,651,554 A | 3/1987 | Grudzinskas | |
| 4,677,702 A | 7/1987 | Cairns | |
| 4,730,391 A * | 3/1988 | Wood | 30/90.1 |
| 5,016,500 A * | 5/1991 | Conrad et al. | 81/9.4 |
| 5,201,254 A | 4/1993 | Davies | |
| 5,337,479 A | 8/1994 | Ducret | |
| 5,669,132 A | 9/1997 | Brimmer | |
| 5,674,027 A | 10/1997 | Warnaar | |
| 5,878,501 A | 3/1999 | Owens et al. | |
| 6,079,104 A | 6/2000 | Krampe | |
| 6,234,050 B1 | 5/2001 | Konen et al. | |
| 6,526,661 B1 | 3/2003 | Shutts et al. | |
| 6,691,403 B1 | 2/2004 | Murg | |
| 6,718,638 B2 * | 4/2004 | Liaw | 81/9.4 |
| 6,739,217 B2 | 5/2004 | Hartranft et al. | |
| 6,745,473 B2 | 6/2004 | Lawler | |
| 6,934,991 B2 | 8/2005 | Kinkade | |
| 6,971,178 B2 | 12/2005 | Rowlay | |
| 7,017,448 B2 | 3/2006 | Murphy et al. | |
| 7,021,679 B2 | 4/2006 | Magnusson | |
| 7,076,836 B1 | 7/2006 | Butka | |

(Continued)

FOREIGN PATENT DOCUMENTS

CA   00989152   5/1976

(Continued)

*Primary Examiner* — Hadi Shakeri (57) ABSTRACT

The sheath and conductor strippers embodiments relate to primarily ergonomic handle assemblies with upper and lower jaw portions perpendicular to the jaw-arms. The elongated handle-members can be straight or pistol grip in configuration. The handle assembly has limiting motion hinges. The handle-members are resiliently urged and have a push-button latch assembly. The hand tools manually engaging jaw portions cut wire, strip insulation, slit sheathing, grasp, and crimp. The cutting blade can be either fixed position or adjustable blade carriage. A utility knife with a blade guard having a friction blade guide another device.

1 Claim, 9 Drawing Sheets

U.S. PATENT DOCUMENTS

| | | |
|---|---|---|
| 7,100,481 B2 | 9/2006 | Hartranft et al. |
| 7,356,928 B2 | 4/2008 | Votolato |
| 2007/0234858 A1 | 10/2007 | Sullivan et al. |

FOREIGN PATENT DOCUMENTS

| | | |
|---|---|---|
| CA | 01157244 | 11/1983 |
| DE | 3904323 * | 8/1990 |
| DE | 19635566 | 3/1998 |
| DE | 19635566 A1 * | 3/1998 |
| GB | 972675 * | 10/1964 |
| GB | 2284946 | 6/1995 |
| GB | 2284946 A * | 6/1995 |
| JP | 2006141134 A | 6/2006 |
| JP | 2006158170 A | 6/2006 |
| WO | PCT/EP2004/006490 | 6/2004 |
| WO | PCT/US2005/039697 | 2/2005 |
| WO | WO 2005025023 A1 * | 3/2005 |
| WO | PCT/US2005/039697 | 11/2005 |
| WO | WO 2006050441 A1 * | 5/2006 |

\* cited by examiner

SHEATH AND CONDUCTOR STRIPPERS

CROSS-REFERENCE TO RELATED APPLICATIONS

Ser. No. 12/151,238

FEDERALLY SPONSORED RESEARCH

Non-applicable

SEQUENCE LISTING

Non-applicable

BACKGROUND

The present invention relates to manually engaging wire cutting, wire stripping, and wire insulation slitting hand tools.

Sheath and conductor Wire stripping tools of prior art have deficiencies in safety of usage, line of sight, and operation. An electrician typically scores the sheathing with a utility knife which is versatile when the wiring has bends and twists. Unfortunately the electrician uses a finger to guide the sheath while scoring which can result in minor scratches or stitched tendons. Another safety concern is when stripping conductors overhead on a ladder. When the generic cross-handle conductor stripping slot is not placed precisely around the conductor insulation, the electrician has to manually engage the jaws then use a finger to urge the jaws to finish stripping the conductor in an awkward posture. The situation is also inconvenienced by the unnatural, exerting sideways motion of the wrist, leading to possible musculoskeletal disorders such as carpal tunnel syndrome.

The sheath strippers passageways and attachments shield the cutting blade reducing the bleeding hazard. The pulling motion of the configured wire strippers require less physical effort because the worker is using the large muscle groups in accomplishing the tasks. Further improvements over prior art is a adjustable blade carriage allowing greater accuracy in slitting sheath with numerous blade carriage assembly configurations for various applications. The improved stripper jaw configurations multipurpose or task specific.

SUMMARY

The present inventions relates to primarily ergonomic handled tools for slitting sheathed and stripping insulated conductors. The elongated handle-members can be either straight or L shaped. The handle-members are resiliently urged and have a releasable latch. The hinges have a clevis with a groove and the tang with a sprag, when the hinges are connected with a pin, the length of the groove limits the degree of freedom. In front of the elongated handle members are jaw-arms with the jaws lateral to the handle-members. The jaw-members have nested conductor insulation stripping slots, serrated pliers and wire cutting edges. The jaws configured to be task specific such as only conductor stripping slots on the jaws, terminal crimping only on the jaws, sheath cutting slots with a sheath cutting blade casing on the jaws, and bolt cutting jaws. On the rear portion of the L shaped handle members is a cutting blade casing, sheath passageways, sheath fence, and sheath guides. The cutting blade casing can be either fixed positions or an adjustable blade carriage arrangement. On the sheath wire strippers, in front of the upper handle, the nose has a cutting blade casing and the lower handle has a tongue attachment support. Passageway adaptors and tongue attachments make the hand tools more versatile in wire stripping tasks. Crossed handle wire strippers pivoting longitudinal to engage the lateral jaws which extend past the side edge plane of the handles another embodiment. A utility knife with a spring loaded blade guard attached to a blade guide a further development. The preferred embodiments illustrate the necessary configurations to safely, efficiently strip and slit insulating conductors and sheath of high or low voltage wires with a pulling motion using large group muscles such as the biceps and the deltoid.

DETAILED DESCRIPTION OF THE INVENTION

Figure 1:
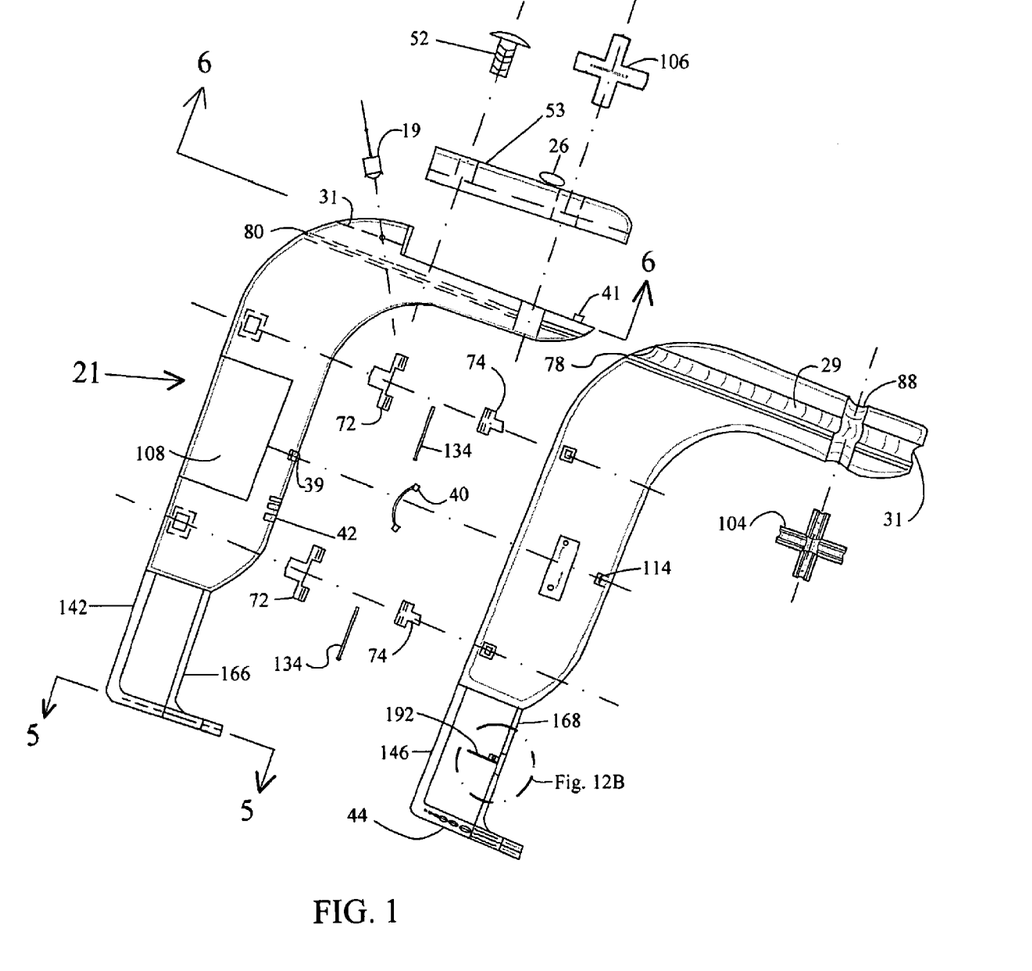
FIG. 1 is an exploded view illustrating the sheath and conductor stripper.

The illustrative embodiments of the sheath and conductor wire strippers are generally shown at 13,14,15,21, 23, and 25 in FIGS. 1,2,3,7, 7A, and 12A. In FIG. 1, the pistol grip handle assembly 21, the upper and lower handles move in lateral cooperation. The range of the handles can be limited by: the beveled edges on the handles periphery, the configuration of the sheath fence 78 and sheath fence groove 80, and a sprag engagement 138 on the tang 74 with a clevis groove 144 on a clevis 72 of the hinges (see FIG. 11C for example). The clevis groove 144 tapered lengthwise to slow the opening action of the handle-members. The periphery of the upper and lower handles shall be beveled sufficiently to minimize the pinching of the hands and fingers of the worker. A recessed mounted leaf spring 40 in the lower handle opens the handles sufficiently for the front jaws 44 to engage in wire cutting, strip conductor and grasping. The leaf spring 40 necessary when the handle members are on either side of plumb. A upper jaw-arm 142 on the hinge side of the handles, a lower jaw-arm 146 on the hinge side of the handles, a upper jaw-arm 166 opposite the hinge side of the handles, a lower jaw-arm 168 opposite the hinge side of the handles sufficient in length to strip conductor without interfering with the handles operation. A wire stripper fence 192 slides on jaw-arm 168 to gauge the length of insulation to be stripped off the conductor with a fence adjustment 194 which can be either threaded, pull-pin or friction in adjustment (see FIG. 12B).

The range of the handles is adequate for receiving sheathed wire into the pistol grip portion of the sheath passageway 31 with the sheath fence 78 preventing the sheath or cable from jamming the closing of the upper and lower handles. An adjustable sheath guide 19 aligns the sheath for slitting by an adjustable blade carriage 68 or 70 (see FIGS. 6B and 6C) as indicated by blade adjustment button 26. Various thickest of sheath can be accommodated with insertion of a pistol grip sheath adaptor 104 and 106, with adaptor 106 which is preferably fiat for positive work-piece engagement and having a blade access slot. In FIG. 1, a spring-loaded stepped blocked sheath guide at the intersections of the sheath passage 3 lis shown in FIG. 11H replacing the adaptor 104 and the adaptor 106. An adaptor compartment 108 stores adaptors such as adaptor 104 and adaptor 106 with space for a dibble blade carriage 70 and blade carriage 68 an option. An electrical test device connected to the jaw-arm 142 with access to a DC battery inside of compartment 108 is possible. Wire bending nested holes 42 shape conductors.

Figure 2:
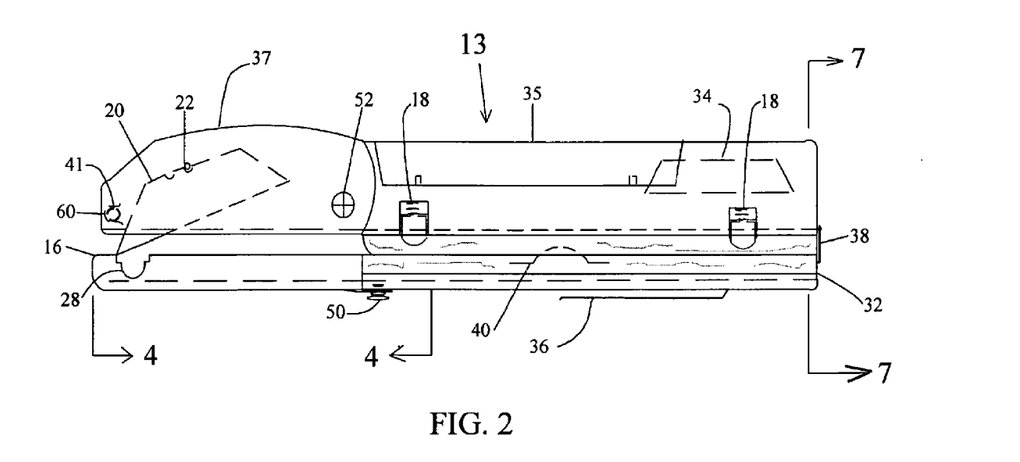
FIG. 2 is a side elevation view of a straight handle assembly sheath stripper.
Figure 3:
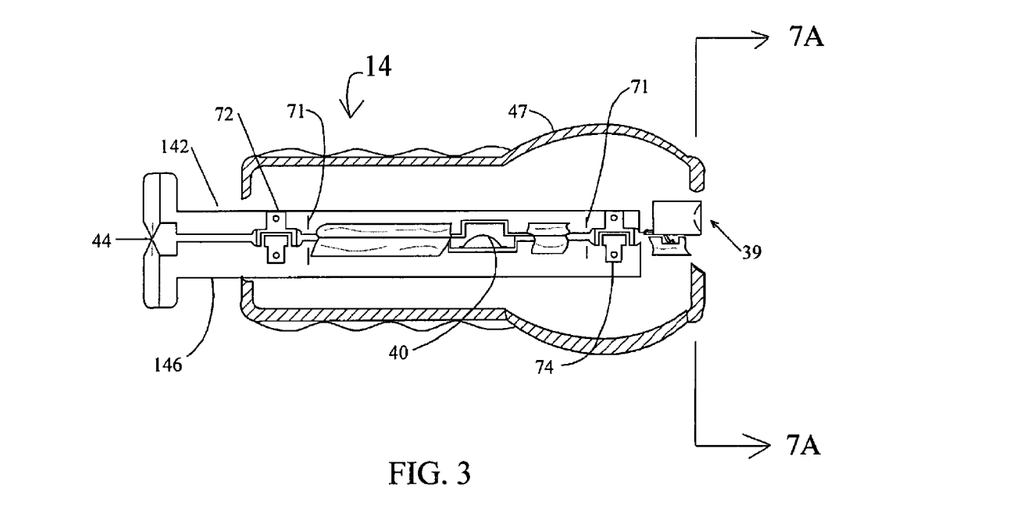
FIG. 3 is a side elevation cross-sectional view of an ergonomic grip straight handle assembly conductor stripper.
Figure 3A:
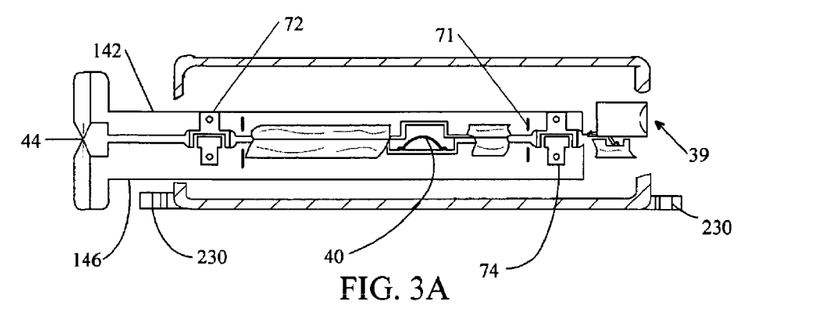

Illustrative of a straight elongated handle stripper 13 of a task specific sheath stripper relates to FIG. 2. The fix positioned cutting blade 20 as shown by the cutting blade snub 22 has two positions in a cutting blade casing 172. The cutting blade 20 is enclosed by a rotating blade cover 37 held in place by a conical pin 41 in a pin groove 60 and a bolt 52. A tongue attachment 16 is held in place by a tongue attachment bolt 50. The tongue attachment 16 is shown to be a chamfer/round sheath attachment 28 notch. The tongue attachment can be integral to the handle-member. The straight handled sheath stripper 13 has two friction sheath guides 18, straight sheath passage 32, a spare blade storage compartment 34, and a tongue attachment storage compartment 35 with a belt clip 36 attached to the lower handle. In FIG. 3, an ergonomic straight handle conductor wire stripper 14 comprises of wire cutting, serrated pliers, and nested conductor stripping slot on jaws 44. An anchor rib 71 on the jaw-arms 142, 46 reinforce the hinges 72, 74 when embedded in resin. A palm/thumb hump 47 on the rear of the handle members is shown. The upper jaw-arm 142 and the lower jaw-arm 146 indicates a pair of jaw-arms on the hinge side whereas FIG. 1 shows two pair of jaw-arms. A push-button latch 39 locks the handles in a closed position.

Figure 4:
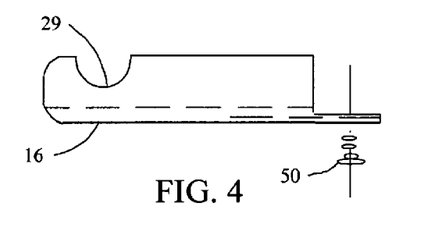
FIG. 4 is a side plan view of a tongue attachment for round sheath taken along line 4-4 of FIG. 2.
Figure 4A:
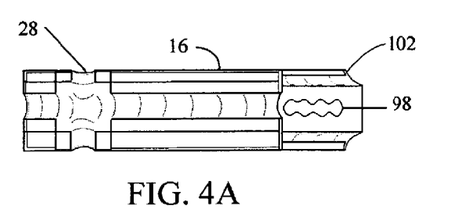
FIG. 4A is a top plan view of a tongue attachment for chamfer/round sheath.
Figure 4B:
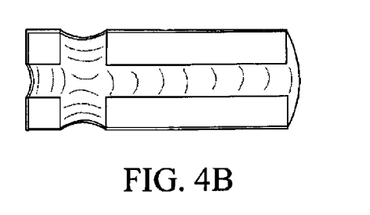
FIG. 4B is a top plan view of a snap-in adaptor for a tongue attachment.
Figure 5:
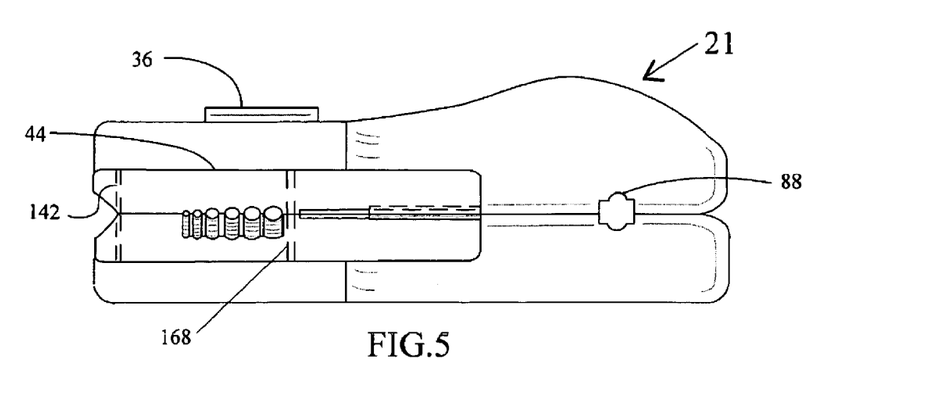
FIG. 5 is a front elevation view of a pistol grip sheath and conductor stripper showing jaws with cutting edges, serrated pliers, and nested conductor stripping slots.
Figure 5A:
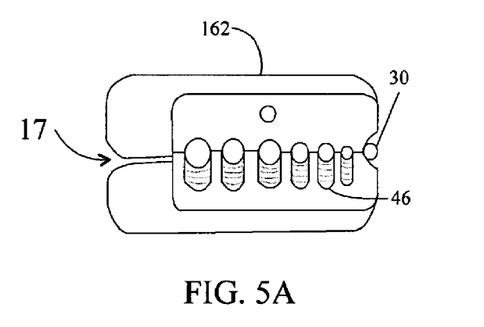
FIG. 5A is a detail view of nested conductor stripping slots jaws with slanted handles.
Figure 5B:
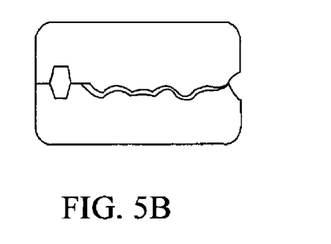
FIG. 5B is a detail view of coaxial and connector crimping jaws.

Turning now to FIG. 4, a tongue attachment 16 with a round sheath 29 notch is shown. In FIG. 4A, the tongue attachment configuration is for chamfer/round sheath 28 with a tongue adjustment slot 98 and a tongue insert channel 102. FIG. 4B is a snap-in adaptor for tongue attachment 16. FIG. 5 shows a pistol grip sheath and conductor wire stripper 21 with wire cutting edges, serrated pliers, and nested conductor stripping slots on jaws 44, the upper jaw-arm 142 on the hinge side, belt clip 36, and an integral chamfer/round sheath passageways 88. FIG. 5A relates to slanted handles on a conductor stripper 17 where the closed handles are below the closed plane of a nested conductor stripper slots on jaws 46 with a wire bending hole 162 on the upper jaw. A hinge assembly 30 consists of a clevis 72 and a tang 74. In the event, the cutting edges on the conductor jaws 44 lack sufficient force to sever the engaged wire, a hinge pin 134 could ride on a crescent or semi-circle pin slot of the clevis 72. FIG. 5B is task specific jaws for coaxial, butt, and terminal connector crimping. A side-cutting jaws 49 relate to the jaws of FIG. 5C with the placement of a conductor 51 shown with the hinge assembly 30.

Figure 6:
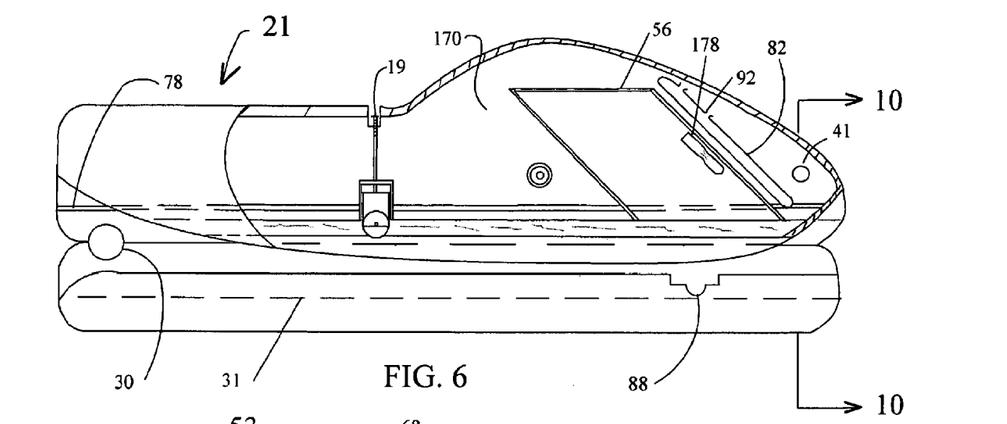
FIG. 6 is a rear cross-sectional view of pistol grip handle with blade carriage wall structure, carriage screed and adjustable sheath guide taken along line 6-6 of FIG. 1.
Figure 6A:
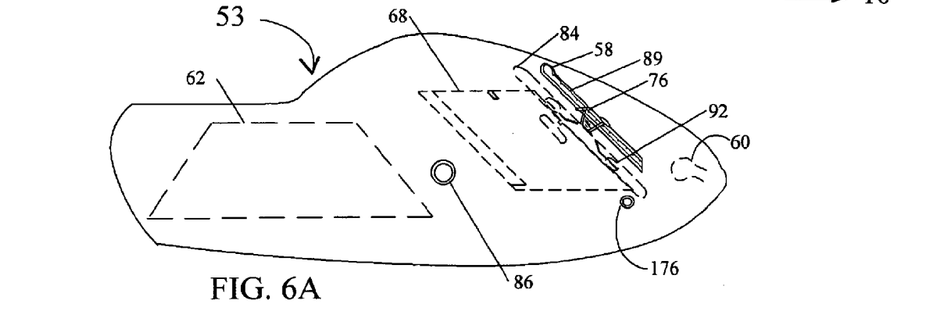
FIG. 6A is a detail view of an adjustable blade cover plate for a pistol grip sheath stripper.
Figure 6B:
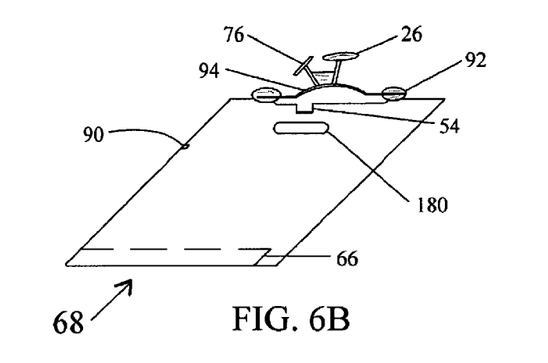
FIG. 6B is a detail view of the adjustable blade carriage.
Figure 6C:
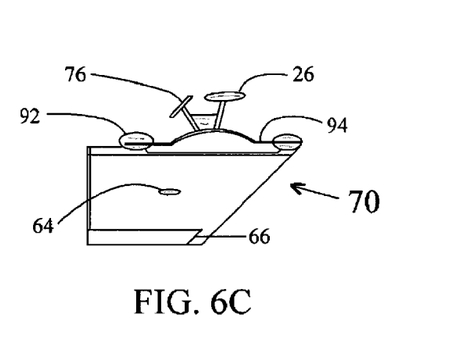
FIG. 6C is a detail view of the adjustable dibble blade carriage.
Figure 6D:
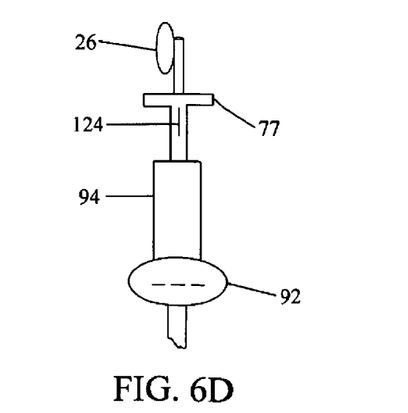
FIG. 6D is a front sectional view of an alternate carriage blade assembly with the tab detent on the same ann structure as the blade adjustment button.
Figure 6E:
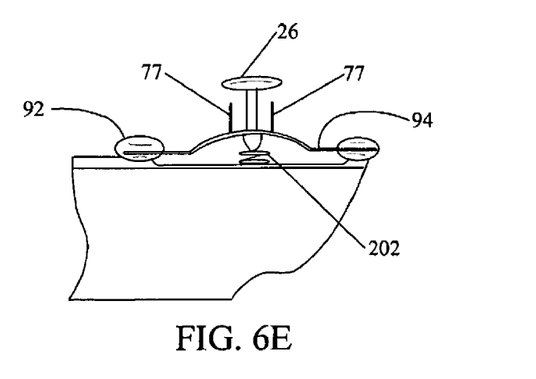
FIG. 6E is a sectional view of a carriage blade leaf spring with two tab detents.
Figure 6F:
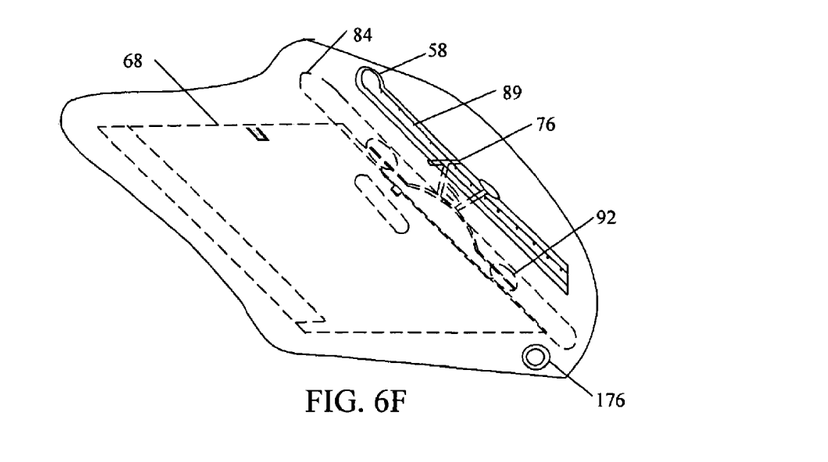

Details of the pistol grip sheath and conductor stripper 21 shown in FIG. 6 relate to a handle body blade carriage wall structure 56 and a handle body carriage screed 82 with a carriage shoe 92 access slots in a cutting blade casing 170. A bolt adjustable sheath guide 19 with a roller guide is also shown. In FIG. 6A, the details of an adjustable blade cover 53 rotates into position on conical pin 41 in cover pin groove 60 comprises an adjustment button escapement 58 slot with the elongated slot portion having tab detent catches 89. A blade carriage tab detent 76, 77 with carriage shoes 92 fits in a cover carriage screed 84. The pistol grip adjustable blade cover 53 stores spare blades in compartment 62 and has bolt hole 86, also shown is a blade replacement button 176. The blade replacement button 176 can be configured to slide to eject the cutting blade (not shown) requiring less hand manipulation. A replacement button 176 should be recessed from the finished surface. A blade carriage assembly 68 is shown in further detail in FIG. 6B. The blade carriage assemblies 68 and 70 of FIG. 6B and FIG. 6C are similar in principle in that both have a tab detent 76 arm connected with the blade adjustment button 26 ann, carriage shoes 92, a blade carriage leaf spring 94 inserted or integral in the carriage shoes 92 and a blade channel 66. The carriage structure in blade carriage 68 is substantially larger than blade carriage 70. Carriage 68 has a blade flange stop 90, a blade clip 54 for a semi-circle notched top edged blade, and a carriage tension spring 178 that puts pressure on an installed cutting blade. Whereas Carriage 70 is substantially smaller in size for a dibble-type blade with a interior blade snub 64, the blade snub 64 can travel on a screed (not shown). FIG. 6D relates to a blade carriage structure where the blade adjustment button 26 arm and the tab detent 77 arm are on the same arm structure with a strut 124 below the tab detent 77. Another difference between the tab detent 76 and the tab detent 77 is in the orientation of the tab: the tab flange on the tab detent 76 is lateral in placement and the tab flange on the tab detent 77 is longitudinal in placement. FIG. 6E relates to the carriage spring 94 having insert molded two tab detents 77, a spring nub 204 and the adjustment button 26. In another variation, the two tab detents 77, the spring nub 204 and the adjustment button 26 assembly clip-on to the carriage spring 94 (not shown).

Figure 7:
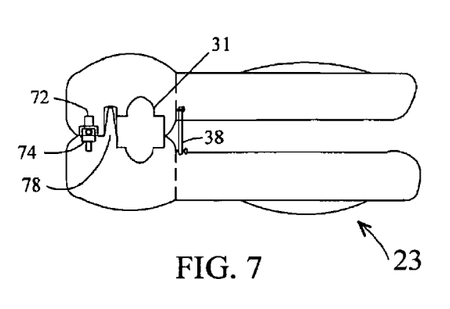
FIG. 7 is a rear plan view of FIG. 2 taken along line 7-7 with an integral ergonomic pistol grip handle feature added
Figure 7A:
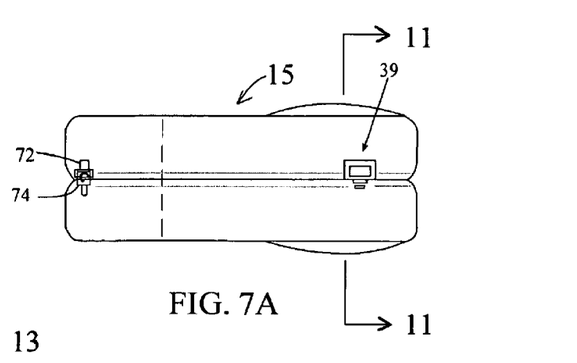
FIG. 7A is a rear plan view of FIG. 3 taken along line 7A-7A with a integral ergonomic pistol grip handle feature added.
Figure 8:
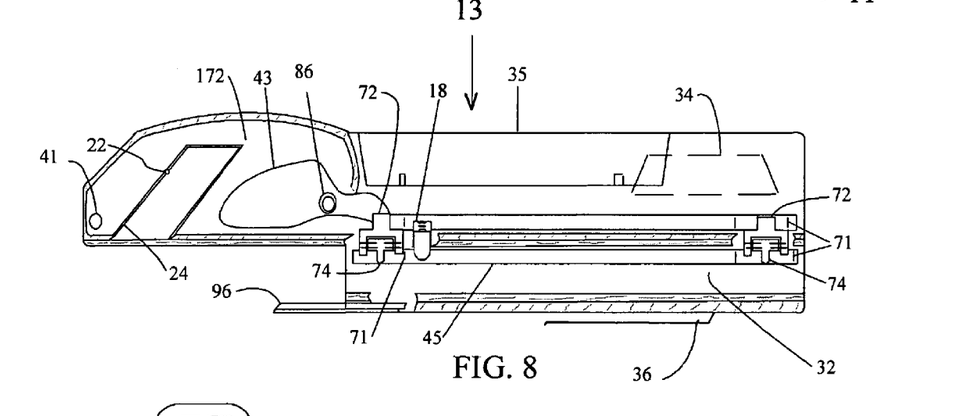
FIG. 8 is a side cross-sectional view of FIG. 2 where the cutting blade casing portion, hinge, and tongue attachment support is embedded in the handle assembly.

Moving on, in FIG. 7 the pistol grip sheath stripper assembly 23 is configured similar to the straight handle sheath stripper assembly 13 with an integral ergonomic pistol grip handle feature added-on, a swivel hook latch 38 is noted. The leaf spring 40 (not shown) is placed parallel between the sheath fence 78 and the tang 74. Again in FIG. 7A the conductor stripper assembly 15 is similar to the FIG. 3 conductor stripper assembly 14 with an ergonomic integral pistol grip handle feature added-on, a push-button latch 39 is noted. Heretofore the describe preferred embodiments can be made of either metal or a metal and molded non\-metallic combination indicative of the straight handle conductor stripper 14 and straight handle sheath stripper 13 shown in FIGS. 3 and 8. Further, FIG. 8 relates to hinge assemblies connected to a blade casing reinforcement plate 43 and a skeletal plate 45. The plate or shaft of clevis 72, the plate or shaft of tang 74, the tongue attachment support 96 can be embedded in molded resins. In that the embodiments usage is around electricity, the configurations shall be adequately insulating coated to industry standards. Sheath stripper 13 shows a fixed cutting blade wall structure 24 with the blade snub 22. In reviewing FIGS. 6, 6A-6D, modifications of the cutting blade casing 172 and the carriage blade cover 53, reconfiguring blade wall 24 similar to the carriage blade wall 56, and adding carriage screed 82 a adjustable blade sheath stripper 13 is possible. Likewise, the sheath and conductor stripper 21 can be modified to a fixed blade cutter by reconfiguring the cutting blade casing 170 and the adjustable blade cover 53 as seen in FIG. 6A and similar to fix blade cover 37 as seen in FIG. 2. Further the blade carriage wall structure 56 could be modified to a fix blade wall structure 24 as seen in FIG. 8. A blade replacement mechanism comprising of a blade replacement button 176 with a spring loaded shaft on the blade cover, a blade replacement slot 180 on the blade carriage assembly 68, and a carriage tension spring 178 on the cutting blade casing 170 and 172 within blade wall structures 24 and 56. Furthermore a generic razor blade carriage assembly is possible based on the previously mentioned modifications. Also without the sheath tongue attachment 16 bolted to the tongue attachment support 96, the sheath stripper 13 of FIG. 2 could be used as a cutting tool similar to a generic utility knife. In which case, the tongue support 96 could act as a short finger or work-piece guide. When primarily used as an utility knife cutting tool, many handle assembly members would be unnecessary.

Figure 9:
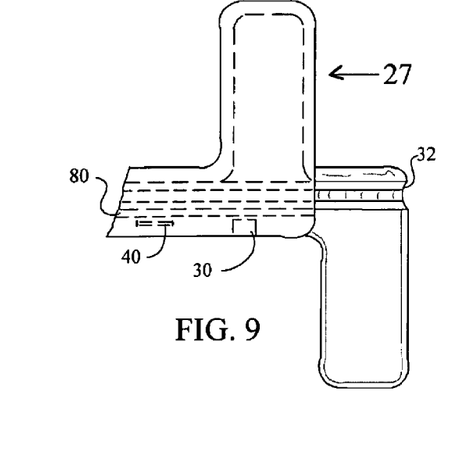
FIG. 9 is a fragmentary top view of a off-set T handle configuration on a sheath stripper taken along line 7-7 of FIG. 2, the view in FIG. 9 could also be used for the conductor stripper without the sheath passageway, sheath fence, and sheath groove taken along line 7A-7A of FIG. 3.
Figure 10:
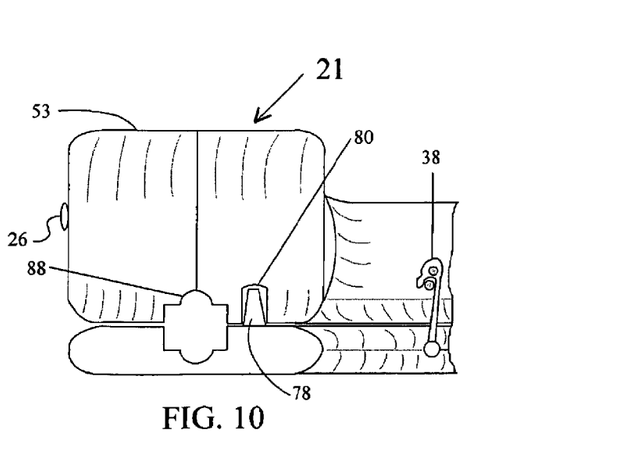
FIG. 10 is a side butt-end fragmentary view of the pistol grip sheath stripper portion taken along line 10-10 of FIG. 6.
Figure 11:
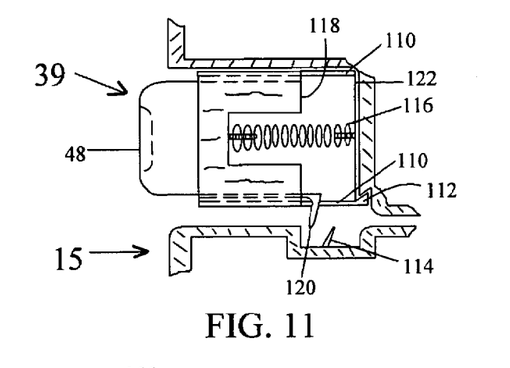
FIG. 11 is a cross-sectional detail view of a push-button latching mechanism taken along line 11-11 of FIG. 7A.
Figure 11A:
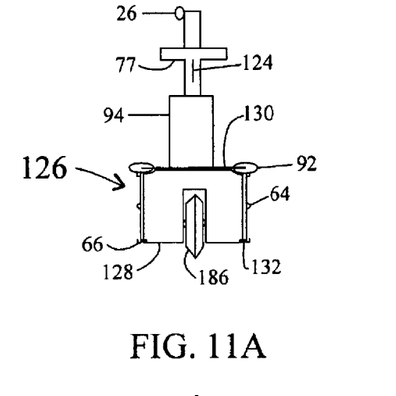
FIG. 11A is a front plan view of a dual blade carriage assembly with a cutting disk inserted in the carriage block.

Turning now to, FIG. 9 relates to an off-set T handle (27) integrally attached to the rear of sheath stripper 13 (see FIG. 2). A sheath passageway 32, sheath fence 78 and sheath fence groove 80 would be unnecessary if the off-set T handle (27) is integrally attached to the rear of conductor stripper 14 (see FIG. 3). The details of pistol grip stripper 21 in FIG. 10 comprise an integral chamfer/round sheath passageway 88, a sheath fence 78, a sheath fence groove 80, and swivel hook latch 38. In FIG. 11 the push-button latch assembly 39 relates a push-button housing 118, a back wall insert 122 with a prong, a compression spring 116 between the back wall insert 122 and a push-button 48 with a prong. The push-button latch 120 is integral with the push-button 48. The push-button latch 120 engages with a catch 114 on the lower handle of pistol grip conductor stripper 15. The push-button assembly 39 slides into the upper handle portion on races 110 and is held in position by a keeper 112. Where a push-button latch 39 is shown on the drawings, a swivel hook latch 38, a sliding latch 195 (see FIG. 12D) can be substituted; as with where a swivel hook latch 38 is shown a push-button latch 39 or a sliding latch 195 can be substituted. In a dual blade carriage assembly 126 shown in FIG. 11A, a carriage bridge 130 joins the two blade carriages, the carriage pegs 132 on the blade carriage structure hold a carriage block 128 in place with the carriage block receiving a cutting disk 186. The carriage shoes 92 can run the length of the blade carriage assembly 126. The blade snub 64 indicates a dibble-type blade carriage. The tab detent 77 indicates an arm structure similar to FIG. 6D.

Figure 4C:
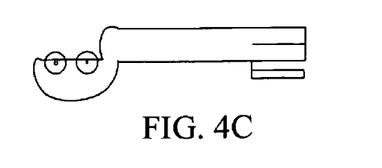
FIG. 4C is a side plan view of a tongue attachment that slides into the handle sheath passage and has a roller cradle.
Figure 11B:
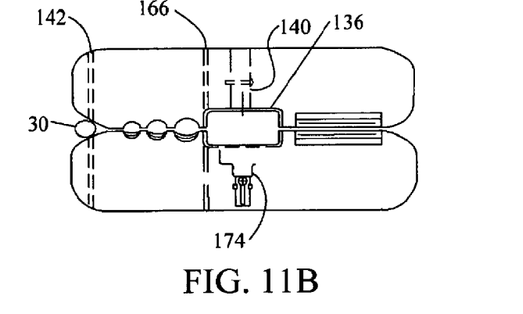
FIG. 11B is a front detail view of jaws with chamfer sheath cutting slots, cutting blade casing, nested conductor stripping slots, and wire cutting edges.
Figure 11C:
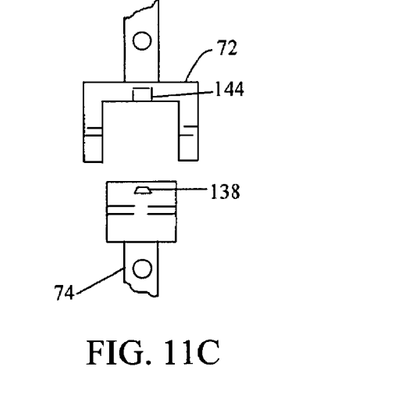
FIG. 11C is a sectional detail view of the clevis and the tang with a motion limiting sprag on the tang.
Figure 11D:
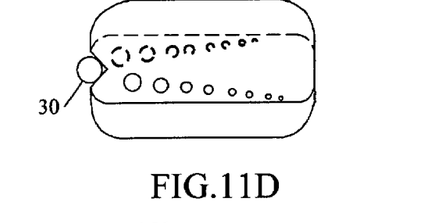
FIG. 11D is a front detail view of jaws for severing bolts.
Figure 11E:
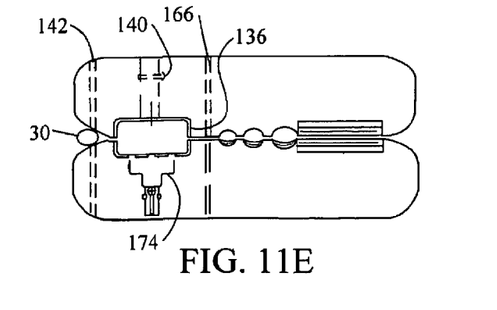
FIG. 11E is a front detail view of the jaws with the sheath cutting slots aligning with the passageways of the elongated handle members with nested conductor striping slots, wire cutting edges.
Figure 11F:
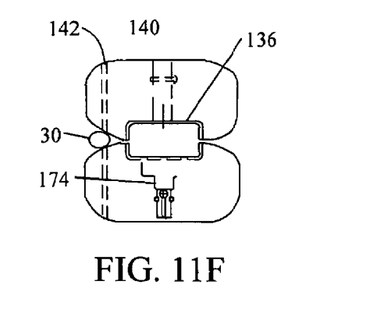
FIG. 11F is a front detail view of the jaws with the sheath cutting slots aligning with the passageways of the elongated handle members.

Turning now to FIG. 6E, the leaf spring 94 receives the adjustment button 26 with the tab detent 77 on each side of the adjustment button 26 to withstand the increased stress of a cradle roller adapter shown in FIG. 4C or the cutting disk 186. Nested conductor stripping slots, a sheath cutting slot 136, a adjustable stepped chamfer guide 174 and a cutting blade casing 140 and wire cutting edges is shown in FIG. 11B. The sheath cutting slot 136 is shown in a different position in FIG. 11E, with the cutting slot 136 aligning with passageways of the elongated handle members. As with the conductor jaws 44, the upper jaw-arm 166 that is on the opposite side of the hinge should be inside the body of the upper and lower handle to allow cutting wire and stripping sheath clearance beyond the elongated handle members. The sheath cutting slots 136 and 182 (see FIGS. 11B and 12) configured to cut metal and plastic conduit. In FIG. 11C, the tang 74 with a motion limiting sprag 138 is shown, with a clevis groove 144 depth on the clevis 72 determining the degree of freedom and the clevis groove 144 length tapered to slow the opening of the handles. Bolt cutting jaws with severing holes is shown in FIG. 11D. In FIG. 11F, the jaws have the sheath cutting slot 136, the cutting blade casing 140, and the stepped sheath guide 174.

Figure 11G:
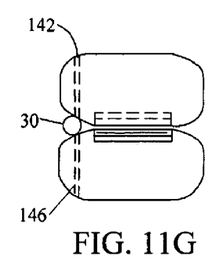
FIG. 11G is a front detail view of jaws having wire cutting edges on the elongated handle members.
Figure 11H:
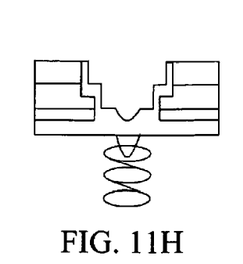
FIG. 11H is a profile detail view of a spring-loaded traverse stepped sheath guide.

The jaw-arms of FIG. 11F can have semi-circle slots on the front portion to accept round conductor for lateral scoring of the round conductor and a tine on the back of the bottom jaw (not shown). In FIG. 11G, the jaw-members have cutting edges with the jaw-arms of sufficient length to reach into an electrical box.

Figure 12:
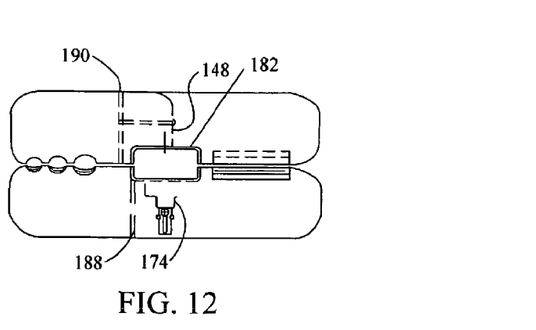
FIG. 12 is a front detail view of jaw members shown in FIG. 12A.
Figure 12A:
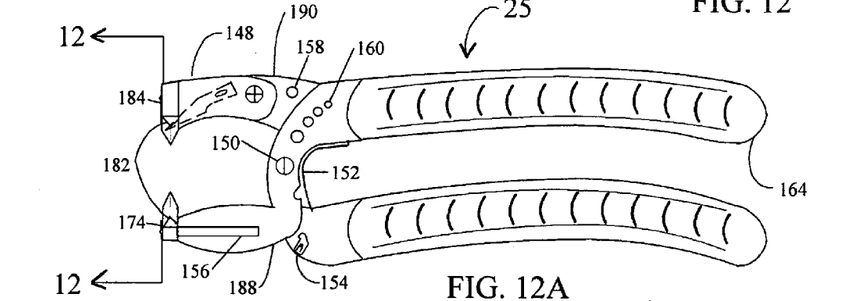
FIG. 12A is a side elevation view of cross-handled wire strippers.
Figure 12B:
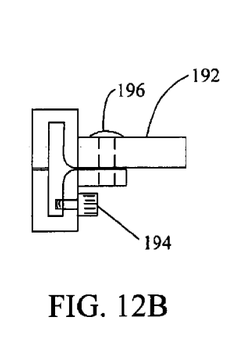
FIG. 12B is a front detail view of a wire stripper gauge fence.
Figure 12C:
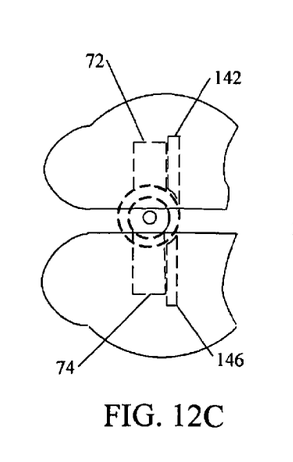
FIG. 12C is a sectional view of an ergonomic grip at the clevis and tang.
Figure 12D:
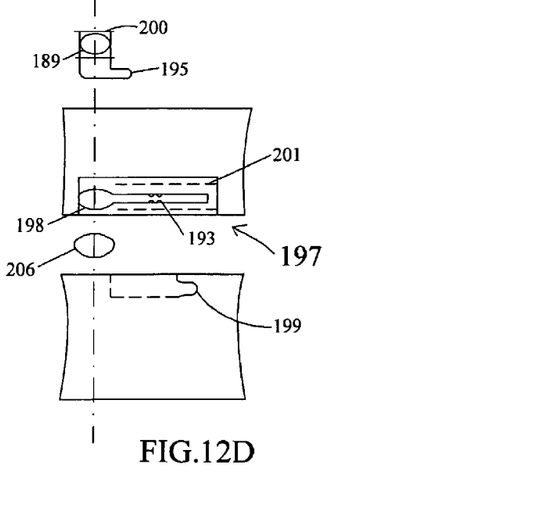
FIG. 12D is a sectional adjacent view of an alternate sliding latch.

An ergonomic cross handle wire stripper 25 with a cross handle pivot 150 and the jaws is shown in FIGS. 12 and 12A. A cutting blade casing 148 can be mounted to the backside of the jaw face or attached to the side of the jaw neck portion. Once again, with the sheath cutting slots 136 and 182 the side walls can be stepped, an adjustable stepped sheath guide 174 or metal inserts filling the slots. An upper adjustable stepped guide 184 is a mirror image of lower stepped guide 174 with the stepped side walls having cutting edges. A tined sheath guide 156 on the lower jaw props up sheathing to be slit. A handle leaf spring 152 opens the cross-handles with the leaf spring 152 upper portion clipping onto the upper handle and the leaf spring 152 lower portion having a boss connecting to the lower handle portion. A helical spring (not shown) would also open the cross-handles, and a cross-handle latch 154 locks the jaws in the closed position. In addition, there is a wire bending hole 158, bolt severing holes 160 on the crossed handle. The crossed handles have a insulating coated grip 164 with ergonomic contours. FIGS. 12 and 12A show the positions of a sheath jaw-neck 188 and a casing jaw-neck 190 on the cross handle wire stripper 25. A wire stripper fence 192 is shown in FIG. 12B and on jaw-arm 168 in FIG. 1, though the wire stripper fence 192 easily placed on jaw-arm 146 of FIG. 3. The wire stripper fence 192 is in two sections held together with a fence bolt 196. An ergonomic grip portion protrudes in the hinge area of the clevis 72 and the tang 74 as shown in FIG. 12C and the jaw-arms 142 and 146 are notched in the hinge area (see FIG. 3). FIG. 12D relates to a sliding latch 195 with a sliding button 189, and a cover shoe guide 200. A sliding cover 197 has a button access 198 and a friction nub 193 and an elongated slot on the underbelly. The sliding latch 195 fits into a shoe raceway 201 on the sliding cover 197. An assembly plug 206 fits into the button access 198 keeping the sliding button 189 fi'om sliding back to far and jamming. The slide button 189 wedges the shoe guides 200 on the shoe raceways 201 of the sliding cover 197. The shoe raceways on the handle member are the length of the cover 197 (not shown). The handle member can have a female interlock around the periphery and the sliding cover 197 a male interlock around the periphery or the sliding cover 197 fused to the handle member. When the handle-members are closed the sliding latch 195 engages a sliding catch 199. Again where the push button latch 39 and the swivel hook 38 are shown on the drawings the sliding latch 195 can be substituted.

Figure 12E:
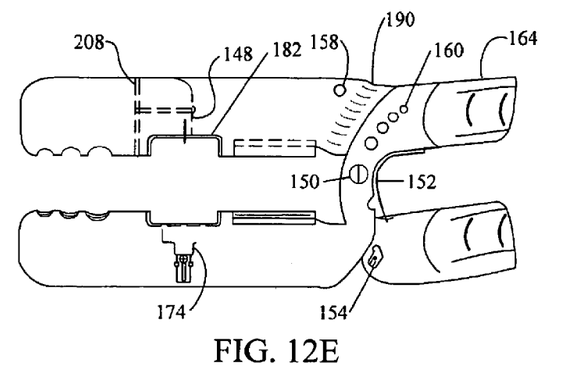
FIG. 12E is a sectional side view of jaw-members parallel with cross handle-members.
Figure 12F:
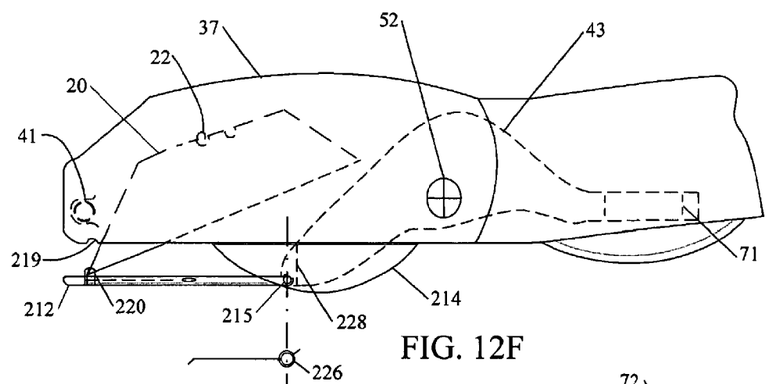
FIG. 12F is a side elevation view of a fixed cutting blade and ergonomic handle-member.
Figure 12G:
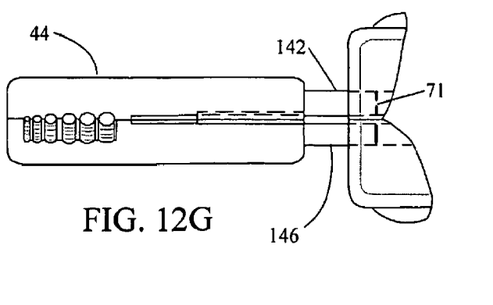
FIG. 12G is a sectional side view of jaw-members parallel with the jaw-arms and handle-members.
Figure 12H:
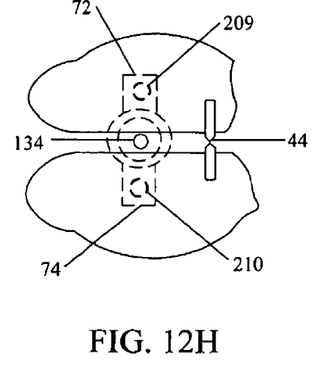
FIG. 12H is a sectional front view of jaw-members parallel with the handle members.

Moving on to FIG. 12E, the jaw-members are shown parallel to the handle-members. The cutting blade casing 148 can be attached to a casing plate 208 or to the back of the upper jaw. In FIG. 12F, the handle member is one piece with the blade casing plate 43 extending to the pivot rivet 215 and anchor ribs 71 reinforcing the handle. With a metal handle and metal cutting blade casing, the blade casing plate 43 would be unnecessary. A fix blade snub 22 is shown and the carriage blade assembly 68 or the dibble blade casing assembly 70 configurations substituted. A rivet pivot 215 attaches a blade guard 212 pivotally to a blade guide 214 with a guard stop 216 limiting rotation. The blade guard 212 has elongated slots on the underside, a sleeve spring 218, and a friction guide 220 is shown. The elongate portions of the blade guard 212 edges are rounded. The friction guide 220 configured to reduce the stress on the cutting blade. The friction guide 220 fits into a friction guide notch 219 when the blade guard 212 is rotated to the blade casing nose. With FIG. 12G, the nested jaw-members 44 are parallel with the handle members and as shown in FIG. 12H a distance from the hinge pin 134. In FIG. 12H because the hinge assembly 30 is not connected to the jaw-arms 142 and 146, a top hinge reinforcement rod 209 and a bottom hinge reinforcement rod 210 are shown which connect and extend past the hinges.

Operation

The sheath and conductor wire strippers focuses on the electrical trades with plumbers and other fields finding beneficial applications. In discussing the preferred embodiments, definitions of the lateral actuation of the handles and the term task specific is essential. By lateral actuation assume that coordinates (0, 0) is the on-center axis of the hinge, the Y axis is the upper handle and the X axis is the lower handle. When the Y handle makes contact with the X handle, the stripping tool is in the closed position. As the Y handle rotates counterclockwise away from the X handle, the assembly is opening, and when the Y handle rotates clockwise back to the X handle the assembly can manually engage the work-piece. When electricians, production workers and the like are doing the same task for extended periods of time, the stripping tool can be task specific. In general, the sheath stripper 13, conductor stripper 14 as is the pistol grip sheath stripper 23 and the pistol conductor stripper 15 are task specific with FIGS. 4,5A, 5B,5C, 11A, and 11G further examples of task specific. The arrangement of the conductor jaws 44 has the wire cutting edges are on the outer edge of the jaws for cutting wire. The serrated pliers are in the center so there is less likelihood the conductor is inadvertently cut when the intention is to strip the conductor of insulation. In the event, it becomes apparent the worker is pinched by the wire cutting edges, a rearrangement of the conductor jaws 44 is possible. A solution would be to put the cutting edges of conductor jaws 44 on the hinge side requiring a passageway similar to sheath passageway 31 so the sheath and conductors miss the front of the handle-members. A pistol grip on the elongated handles allows more dexterity in operation and ease of pull (see FIG. 1, for example) which shows a left-hand pistol grip based on the cutting blade being on the upper grip handle and FIG. 10 shows a partial view of a arbitrary fight-handled pistol grip 21. Furthermore, conductor stripper 15 and sheath stripper 23 would be considered arbitrarily right-handed grips. With conductor stripper 15, the wire cutting edges of the jaws is on the side of the pistol grip handle side. Indicia on blade cover 53 to indicate the cutting blade location. Snap-in pistol grip sheath adaptors 104 and 106 can be configured for high and low voltage conductor slitting operations. A spring loaded, cross shaped adaptor in the handle member, such as FIG. 11H can replace the adaptor 104. Once the sheathed conductor is slit and then placed in the sheath notch transversely to the cutting blade, in the case of round sheathing the engaged handle assembly would rotate, whereas with rectangular chamfer sheathing the engaged handle assembly would rock back and forth and then the sheathing stripped off the conductor. The sheath stripping notches can be task specific in configuration and integral in the upper and lower handles similar to chamfer/round sheath passageway 88. The lower portion of pistol grip adjustable blade cover 53 is curved (see FIGS. 6 and 6A, for examples) for greater ease in receiving the sheath in the sheath passageway 31 and also allow opening of the handles. The slot in which the push-button adjustment button 26 slides is recessed with protruding walls to prevent unwanted adjustment (not shown). When the adjustment button 26 is in the button escapement 58 position the blade carriage can be removed, and the cutting blade be replaced. When the adjustable blade cover 53 is put back on, the blade adjustment button 26 is in a certain position so the carriage shoes 92 insert into the carriage screed 82 as the blade adjustment cover rotates back into a closed position on the cutting blade casing 170. The carriage screed 82 is configured so the fully retracted blade carriage allows escapement, the access slots lineup with the carriage shoes 92, and also limits the extending movement of the cutting blade. By limiting the extending movement of the cutting blade, reduce the chance of a workers finger getting pinched or cut. The tab detent catches 89 are spaced for fine adjustment. A blade replacement button 176 on blade covers 37 and 53 allows the cutting blade to be replaced when the blade carriage assembly has a blade replacement slot 180 and a carriage tension spring 178 on cutting blade casing 170 (see FIG. 6 for example). The carriage tension spring 178 has a drawn tip where the cutting blade slides up and clicks into the blade clip 54. When the blade replacement button 176 is pushed, the shaft goes through the blade replacement slot 180 of the carriage structure, and pops-out the cutting blade from blade clip 54. When using the blade replacement assembly, the pistol grip handles 21 range sufficient to replace a cutting blade. In the lower handles of the wire strippers, the leaf spring 40 is recessed for positive contact of the closed handle assembly. Gravity opens the handle members in most cases with the leaf spring 40 necessary when the handle members are on either side of plumb. When a stripped conductor is placed in a wiring bending hole 42 and the handles are rotated, the conductor is shaped to hook electrical terminals.

In straight handle sheath stripper 13, the fixed cutting blade 20 shows two snub knockouts for two blade positions in the cutting blade easing 172. As the wiring gets larger and larger in American Wire Gauge (AWG) the gauge number gets smaller and smaller. So as the AWG number gets smaller, the fixed cutting blade begins cutting the sheathing at an angle until the cutting blade is repositioned at snub 22. In these maneuvers, the tongue attachment 16 is adjusted with the cutting blade at the tongue attachment bolt 50, the tongue attachment 16 has adjustment slots 98 (see FIG. 4A) for this purpose. Sheath stripper 13 shows the assembly having two sheath guides 18 which straightens the sheath placed in the sheath passage 32 by friction, though a sheath guide housing with rollers would reduce the fiction thus the effort in pulling sheathed wire. On a job site, the electrician runs the wire into the electrical boxes, tucking the wires into the electrical box, then the job is sheet rocked, dry walled, and painted with the electrician coming back to un-stuff the wiring in the electrical boxes. The wire sheath stripper 13 nose sticks into the electrical box to slit the sheathing either on the topside or underside, for this reason the blade nose should be narrow as possible, and the conductor jaw-arms: upper jaw-arm 142, the lower jaw-arm 146, the upper jaw-arm 166, the lower jaw-arm 168 with sufficient reach. A wire stripper fence 192 can be placed on either jaw-arm 146 or jaw-arm 168 to gauge the length of insulation to be stripped when a fence adjustment 194 engages the jaw-arm (see FIG. 12B). In the straight handle sheath stripper 13, a bolted storage cover 35 can be configured to an ergonomic grip shape and also a ergonomic grip shape on the elongated lower handle member. When the elongated jaw-arms 142 and 146 are connected to the clevis 72 and the tang 74 and a voltage test device is connected to the assembly; the handle grip portion protrudes from the clevis 72 and the tang 74 area to prevent electrical shock (see FIG. 12C) and the extended grip portion also gives additional hinge support.

Figure 5C:
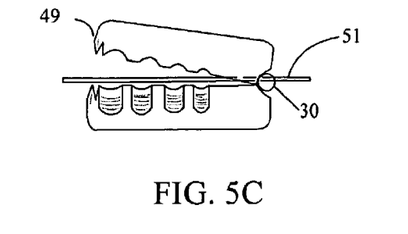
FIG. 5C is a detail view of wire cutting edges on the side of the jaws.

When the electrical job is in conduit, a wire conductor stripper 14 is adequate, in that sheathing doesn't have to be slit. The wire conductor stripper 14 is easier to manipulate in stripping conductor when the electrical boxes are located near the ground, floor, or overhead such as a ceiling box. Slanted handled wire conductor strippers (see FIG. 5), where the handles close below the plane of the jaws for increased axial torque, a wire bending hole 162 on the upper jaw as shown in FIG. 5A; cutting edges and serrated pliers can be added. In the event, that the conductor jaws cutting edges lack sufficient cutting force, a hinge pin 134 riding in a curved slot on the clevis 72 would increase engagement force. In the event a worker keeps getting pinched or cut by the cutting edges of the jaws or working in a tight, confined place the cutting edges on the side of the jaws would be a solution as shown in FIG. 5C.

Without the tongue attachment 16 on the wire sheath stripper 13 (see FIG. 8, for example) the sheath stripper could be use as a generic utility knife with the tongue attachment support 96 a short guide. In FIG. 12F, the tongue attachment support 96 is eliminated and the blade guard 212 attached to the blade guide 214. With a sleeve spring 218 pushing the blade guard 212 past the cutting blade tip, the worker is less likely to get cut. The blade guard 212 prevents a straight edge from getting nicked when scoring, the compression sleeve on the sleeve spring 218 prevents object from getting tangled up, and the blade guide 214 increased leverage when scoring. The blade guard 212 elongate edges are rounded allowing the cutting blade to score at an angle. Since the cutting blade supports and aligns the front of the blade guard 212, the friction guide 220 should be heavy duty in construction. The friction guide 220 fits into the friction guide notch 219 when the blade guard 212 rotates to the blade casing nose. Ergonomic hand grips should be only on the underside of the utility knife. An off-set T handled (27) configuration shown in FIG. 9 would be used in substantially large sized sheath slitting and conductor stripping operations. The push-button latch 39 locks the handle assemblies. When the push-button latch 120 releases from the catch, the handles open and close at will until the push-button 48 is pushed and the handles are in the closed position then the push-button is released to lock the handles (see FIG. 11, for example) with preferably a spring-steel catch 114. The dual blade carriage assembly 126 is similar in principle to blade carriage 68 and dibble blade carriage 70 though the alternate blade carriage shown in FIG. 6D a better fit in operation. When used in configurations such as sheath stripper 13, 23 and pistol sheath and conductor stripper 21 the sheath passageways 31 and 32 would have to be widened. The fixed blade cover 37, blade carriage cover 53 modified for the increased width. The dual blade carriage 126 is for slitting sheath such as outdoor four wire conductor. With the dual blade carriage 126 receiving the cutting disk 186 for cutting conduit and the two tab detents 77 in FIG. 6E allow for greater stress on the carriage assembly.

When the side-walls of a sheath cutting slot 136 (see FIG. 11B) is stepped (not shown), different American Wire Gauges (AWG) such as 10, 12, 14 AWG sheath can be cut and slit. Another alternative of cutting slot 136 is a top stepped metal insert (not shown) although the top cutting edges of the cutting slot 136 would be covered. With an adjustable stepped sheath guide 174, the guide can be positioned below the cutting edge of sheath cutting slot 136. Short fingers on the front and back of the lower jaw under the sheath cutting slot 136 to feed sheath. A blade cutting casing 140 is attached to a jaw-arm 166 with the jaw-arm 166 and elongate handles missing fed wire. Once again, the blade casing 140 can be configured for fixed blade positions or similar to the dibble carriage assembly 70 see FIG. 6C) for task specific process. A clevis 72 with a predetermined length tapered clevis groove 144 length connected with a tang 74 with a sprag 138 limiting the motion of the hinged handles (see FIG. 11C). Bolt cutting jaws with severing holes is shown in FIG. 11D. In FIG. 11E, the sheath cutting slots 136 align with the passageways of the elongated handle members as does FIG. 11F. In the details, the stepped sheath guide 174 is shown on the front of the jaw-member though for manufacturing purposes can be put on the back-side of the jaw member. In FIG. 11G the jaws have wire cutting edges and can also nip sheathing in an electrical box.

The ergonomic crossed handle wire stripper 25 (see FIG. 12A) takes into consideration the pressure points of the hand, line of sight, posture, and use of the large muscle groups. With jaws show in FIG. 12 on the crossed handle wire stripper, an electrician can cut wire, strip conductor insulation, and slit sheathing. A tined sheath guide 156 supporting the sheathing, thereby the sheath less likely to bind-up in the sheath cutting slots 136 and 182. With the cutting edges unequal in length and angle on the sheath cutting slots 136 and 182 less likely to bind-up. The unequal cutting edges of 136 and 182 can be hollow ground, parabolic or beveled depending on task specific applications. The sheath cutting slots 136 and 182 configured to accommodate metal and plastic conduit such as metal-clad cable type MC, rigid non-metallic type RNC, and flexible metallic tubing FMT. The lateral jaw-members engaging on only one side of the longitudinal rotating handle-members another option (not shown). A cutting blade casing 148 can be either a fixed position blade or adjustable blade carriage similar to dibble blade carriage 70 (see FIG. 6C) in configuration. The cutting blade casing 148 can be mounted to the backside of the jaw or attached to the jaw neck 190. The adjustable stepped sheath guide 174 shows steps for chamfer sheathing though with a round cutting blade slot 136 and a round stepped guide not shown) round cable can be cut. Also the adjustable stepped guides 174 and 184 stepped side walls can have cutting edges to sever the side of the sheathing. Cutting disk 186 in cutting blade casing 148 instead of a cutting blade would allow slitting armored cable such as type AC. Whereas a cutting disk 186 in duel carriage blade 126 (see FIG. 11A for an example) placed in cutting blade casing 172 (see FIG. 8 for an example) and cradle roller adaptor (see FIG. 4C) allows for the lateral cutting of pipe. A handle leaf spring 152, a bolt severing holes 160, a cross handle latch 154, and a wire bending hole 158 are generic hand tools standards in purpose. Insulating coated grips 164 cover both handle portions having ergonomic contours. In FIG. 12E and FIG. 12G the jaw-members are parallel to the handle members. Conductor and insulation will be cut, depending on the distance from the hinge pin 134 to the parallel jaw-members in FIG. 12G, at an angle. The top hinge reinforcement rod 209 and bottom hinge reinforcement rod 210 hold the hinges in place for insert molding.

The ergonomic handles of the wire strippers consider pressure points on the hands, line of sight, and posture of the worker. The hand tools manually engage to the worker's feel. The hand tools engaging members can be made of metal with the jaw-arms and hinges in cutouts and affixed with bolts, a combination of metal and resin with members inserted in molded resin. When the jaw-arm is embedded in the handle-member, the handle-members assembled then the closed jaw-members can be re-ground for work-piece engaging configurations true. The handle-members can accommodate a voltage test device where the jaw-members, jaw-arms, and cutting blade function as a switch and access to a DC battery inside the storage compartment. The molded resin used in the handle-members capable of withstanding substantial wattage without fatigue and failure. The adjustable carriage blade assembly modified to accept a blade ejecting mechanism eliminating taking-off the blade cover to replace a worn-out cutting blade. The hinge arrangement can be changed to a butt-hinge or friction/torque hinge assembly. The handle-members and jaw potions can engage in parallel contrary to the ergonomic intentions of the embodiments. When jaw-arms 142 and 146 are adequately reinforced with gussets where the jaw-arm intersects with the jaw portion for example, the jaw-arms 166 and 168 would be unnecessary in some applications. The push-button latch assembly 39 constructed to withstand substantial open-close cycles, with other applications such as the latches on doors, luggage, and eases possible. A sliding latch (see FIG. 12D) assembly would require fewer components than push-button assembly 39. If the upper jaw overlaps the plane of the lower jaw and the jaws biased with bolt holes then bolts can be severed. Sheath roller housings 19 on the lower handle of the sheath passage-ways improve feeding the sheathing to be slit. The tongue attachment support 96 modified for such tasks as cutting cartons. The jaw-members engaging on only one side of the cross-handle stripper 25, easier to fabricate. Furthermore, the jaw-members on 14, 21, and 25 can be mortised to the tenon jaw-arms.

The preferred embodiments of the sheath and conductor wire strippers, in the descriptions and operations shown and described, it becomes readily apparent alterations and modifications made to those skilled in the art, without departing from the scope of the invention's illustrative intentions and claims.

I claim:

1. An ergonomic sheath and conductor wire stripper comprising:
    a one-piece body handle member;
    a blade casing plate extending to a pivot rivet at one end and anchor ribs at the opposite end;
    a fixed cutting blade having two positions within a cutting blade casing, the cutting blade being enclosed by a rotating blade cover, the cover being held in place by a cover pin;
    a blade guide attached to the handle member;
    a blade guard rotatably attached to the blade guide at a guide cavity, the blade guard having elongated slots on an underside thereof, a coil spring within said guide cavity and a friction guide; wherein
    the friction guide is configured to reduce the stress on the cutting blade and wherein the friction guide fits into a friction guide notch formed on the casing when the blade guard is rotated to the blade casing.

\* \* \* \* \*